E. E. HUFFMAN.
POWER TRANSMISSION CONTROL.
APPLICATION FILED MAY 9, 1916.
1,287,322.
Patented Dec. 10, 1918.
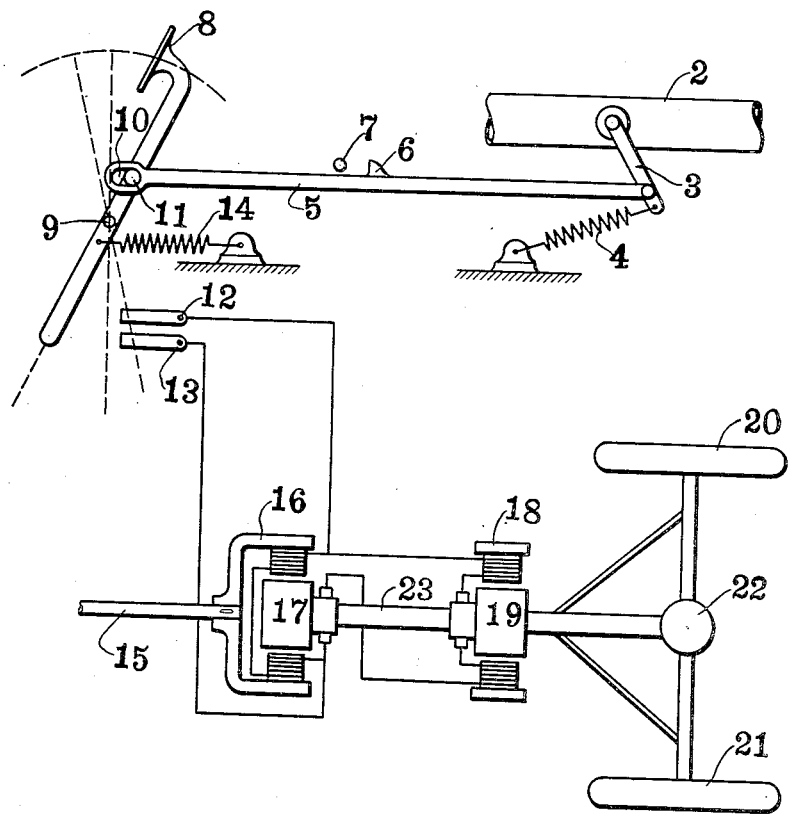
INVENTOR
E. E. Huffman

UNITED STATES PATENT OFFICE.

EDWIN E. HUFFMAN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POWER-TRANSMISSION CONTROL.

1,287,322.    Specification of Letters Patent.    Patented Dec. 10, 1918.

Application filed May 9, 1916. Serial No. 96,273.

*To all whom it may concern:*

Be it known that I, EDWIN E. HUFFMAN, a citizen of the United States of America, residing at the city of St. Louis, State of Missouri, United States of America, have invented a certain new and useful Power-Transmission Control, of which the following is such a full, clear, and exact description as will enable any one skilled in the art to which it appertains to make and use the same, reference being had to the accompanying drawings, forming part of this specification.

My invention relates to the control of self propelled vehicles in which the power from the prime mover is transmitted to the wheels through an electromagnetic transmission apparatus, the object being to provide means whereby the electromagnetic transmission will always be inoperative when generation of power in the prime mover has been reduced to a predetermined amount, or has been entirely stopped.

My invention is more particularly applicable to motor cars in which the prime mover is an internal combustion engine, and in applying my invention to such vehicles I combine the lever controlling the fuel supply with means for rendering the electromagnetic transmission inoperative in certain positions of said lever.

Referring to the accompanying drawing, which diagrammatically illustrates one form of my invention, the electromagnetic transmission consists of a field magnet 16 coupled to the shaft 15 of the internal combustion engine, which is not shown, an armature 17 mounted on the shaft 23 connected to the driving wheels 20 and 21 through the differential 22, and of a field magnet 18 attached to the frame of the vehicle and coöperating with an armature 19 mounted on the same shaft as the armature 17. This kind of an electromagnetic coupling is well known in the art, and it is usual to connect the armatures and the field magnets of the two dynamo electric machines constituting same, in series, as shown in the drawing.

The pipe 2 connects the carbureter with the intake manifold of the engine, and the lever 3 controls the flow of fuel through this pipe by means of a valve attached to said lever. The spring 4 tends to return the lever 3 to its "closed" position in which the fuel valve is practically closed, only sufficient fuel being admitted to cause the engine to run "idle." The rod 5 is attached to the lever 3 and also coöperates with a fuel control lever 8 pivoted at 9. The coöperation of the lever 8 and the rod 5 is brought about by a pin 11 attached to the lever 8 and preferably coöperating with a short slot 10 provided in the rod 5. The spring 14 attached to the lever 8 tends to move the latter, so as to permit the spring 4 attached to lever 3 to close the fuel supply valve. The movement of the rod 5, and therefore of the fuel supply valve, is limited in a suitable manner such as a shoulder 6 attached to the rod 5 and coöperating with a stop 7 the position of which may be regulated at will. As previously stated, the proportions are preferably so chosen that when the shoulder 6 comes into contact with the stop 7 the fuel valve admits just enough fuel to the internal combustion engine to enable the latter to run idle. In order to enable the projection 6 to come into contact with the stop 7, the operator must allow the lever 8 to travel in a counter-clock direction about its pivot 9. During this movement the spring 4 will force the lever 5 from right to left, keeping the right-hand end of the slot 10 in contact with the pin 11 of the lever 8. A further counter-clock movement of the lever 8 will not change the position of the rod 5 but will cause the pin 11 to slide along the slot 10. The contacts 12 and 13 connected to the terminals of the field winding of the generator are so located that as soon as, or shortly before, the lever 8 loses control of the rod 5, and therefore of, the fuel valve, the extension of said lever beyond its pivot 9 bridges the contacts 12, 13, and thus short circuits the field winding of the generator. The slot 10, when provided, permits sufficient further movement of 8 to increase either the contact pressure or the contact area at 12 and 13. This short circuiting renders the electromagnetic transmission inoperative by deënergizing the generator 16, 17.

It is usual to arrange the lever 8 to be controlled by the foot of the operator. When he desires to reduce the speed of the vehicle by applying the brakes, he will naturally remove his foot from the lever or pedal 8 and place it on the brake pedal. This simple and natural movement will not only reduce the fuel supply to the amount necessary to just enable the engine to run light, but will also render the electromagnetic coupling inoperative and permit of the application of the brakes without danger of stopping the engine, the short circuiting of the field winding of the generator being in this case equivalent to disengaging the clutch on a gasolene car of ordinary construction.

Another advantage of the arrangement described lies in the fact that without any further manipulation of circuits by the operator the electrical transmission remains inoperative while the engine is running idle, and a smaller quantity of fuel is necessary to maintain the idling speed than would be the case if current were being produced by the generator. When it is desired to operate the vehicle, forward movement of the pedal 8 opens the generator field short circuit and this renders the electric transmission again operative.

It is the usual practice to also provide a hand operated lever for controlling the fuel valve lever 3, and it will be apparent that when such lever is connected to 3 its operation will control the movement of the rod 5 and pedal 8 to render the electromagnetic transmission operative or inoperative in a similar manner as when the fuel valve is operated by the pedal 8.

While I prefer to render the electromagnetic coupling inoperative in the manner described, yet I can achieve the same purpose in other ways, for instance, by interrupting the circuit between the generator and the motor. It will also be understood that my invention is applicable in connection with forms of electro-magnetic transmission other than that of the particular type illustrated.

Having fully described my invention, what I claim as new and desire to secure by Letters Patent of the United States is:

1. In apparatus of the class described, the combination of a prime mover, a driven shaft, dynamo electric apparatus for transmitting power from the prime mover to the driven shaft, and means rendering the transmission apparatus inoperative when the power developed by the prime mover is reduced to a predetermined extent.

2. In apparatus of the class described, the combination of a prime mover, a driven shaft, dynamo electric apparatus for transmitting power from the prime mover to the driven shaft, means for controlling the power developed by the prime mover and means governed by the said controlling means for rendering the transmission apparatus inoperative.

3. In apparatus of the class described, the combination of an engine, a driven shaft, dynamo electric means for transmitting power from the engine to the driven shaft, a power-controlling valve for said engine, valve operating means, and a switch for rendering the power transmitting means inoperative, the operation of said switch being controlled by the valve operating means.

4. In apparatus of the class described, the combination of an internal combustion engine, a driven shaft, dynamo electric means for transmitting power from the engine to the driven shaft, a switch for rendering the dynamo electric transmitting means inoperative, and means causing said switch to assume a position in which the dynamo electric means is rendered inoperative when the fuel controlling valve of the engine is placed in a predetermined position.

5. In a motor vehicle, the combination of an engine, a driven shaft, a series generator having one member driven by the engine and the other connected to the driven shaft, a power-controlling valve for said engine, and means short circuiting the field of the generator when the engine valve is moved to a predetermined extent toward its closed position.

6. In apparatus of the class described, the combination of an engine, a driven shaft, dynamo electric means for transmitting power from the engine to the driven shaft, a power-controlling valve for said engine, valve operating means, a switch for rendering the power transmitting means operative or inoperative, and means controlled by the valve operating means for opening and closing said switch.

In testimony whereof, I have hereunto set my hand and affixed my seal.

EDWIN E. HUFFMAN. [L. S.]